No. 686,141. Patented Nov. 5, 1901.
H. I. SCHANCK.
SPRAYER.
(Application filed Feb. 5, 1901.)
(No Model.) 2 Sheets—Sheet 1.
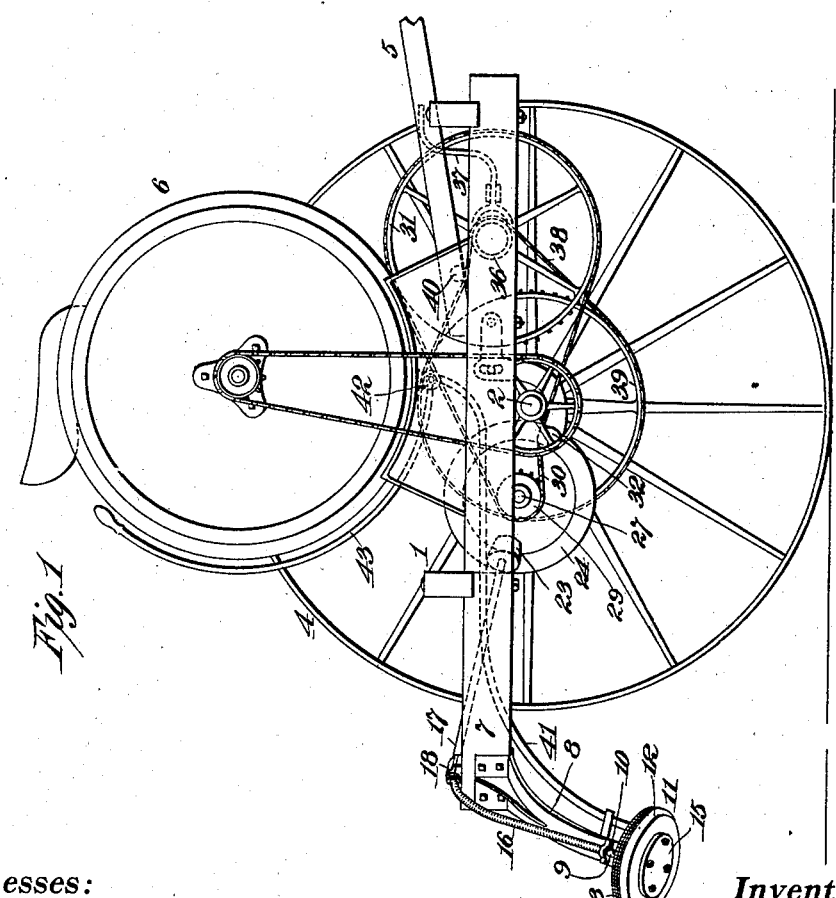

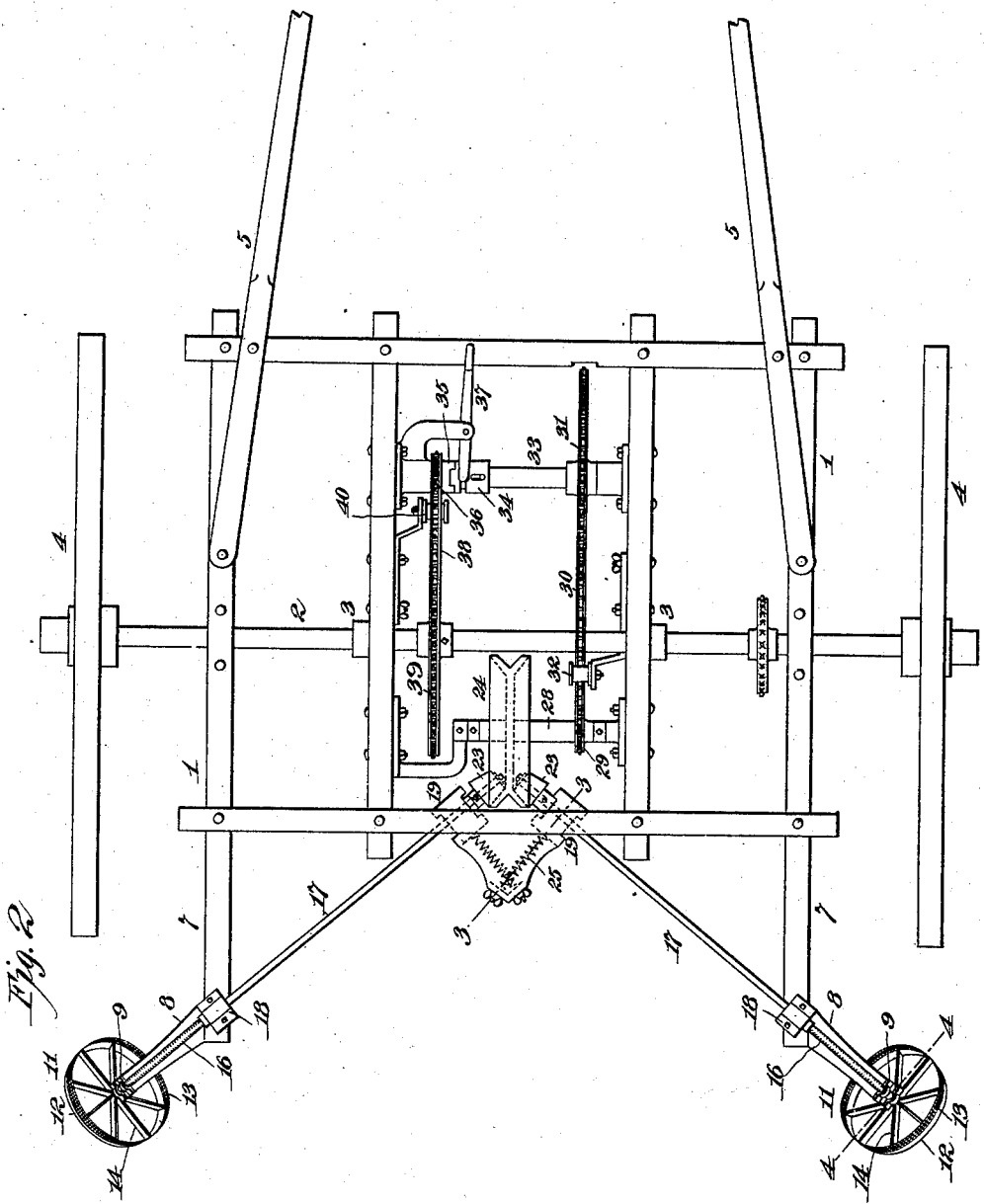

UNITED STATES PATENT OFFICE.

HENRY I. SCHANCK, OF HOLMDEL, NEW JERSEY.

SPRAYER.

SPECIFICATION forming part of Letters Patent No. 686,141, dated November 5, 1901.

Application filed February 5, 1901. Serial No. 46,063. (No model.)

*To all whom it may concern:*

Be it known that I, HENRY I. SCHANCK, a citizen of the United States, residing at Holmdel, in the county of Monmouth and State of New Jersey, have invented certain new and useful Improvements in Sprayers, of which the following is a description.

My invention relates to improvements in "sprayers," so-called, which devices are used for distributing a liquid poison in a fine spray or mist over growing plants for the purpose of protecting them from the ravages of insects.

The object of my invention is to provide a sprayer for this purpose which shall be simple and cheap in construction, effective in use, and wherein the poison will be distributed behind and on each side of the device in the form of a very fine mist or spray.

In order that the invention may be better understood, attention is directed to the accompanying drawings, forming part of this specification, and in which—

Figure 1 is a side elevation of the device; Fig. 2, a plan view with the barrel removed so as to show the driving mechanism; Fig. 3, a section on the line 3 3 of Fig. 2; and Fig. 4 a section on the line 4 4 of Fig. 2, illustrating the detail construction of the spraying-pan.

In all of the above views corresponding parts are represented by the same numerals of reference.

The frame 1 1, generally rectangular in form, is carried on a rotating axle 2 from the bearings 3 3 on supporting-wheels 4, which are preferably connected to the axle 2 by means of ratchets, so as to permit independent movement of said wheels with respect to the axle in turning corners, as is common with wheeled agricultural implements. 5 are the shafts, and 6 the usual barrel or tank for containing the liquid poison and which may be equipped with any desired arrangement, as shown, for stirring the liquid, so as to prevent the sediment from settling, as is common in the art. The side members of the frame are extended at 7, as shown, and connected with such extensions are the brackets 8 8, which extend downwardly, rearwardly, and outwardly. At the lower end of each bracket are bearings 9 9 for receiving the shaft 10 of each spray-pan 11. Each set of bearings 9 9 is so disposed as to sustain the pans 11 substantially in the position indicated, whereby a liquid poison thrown over the edges of the pan by centrifugal effect will be sprayed for its greater part rearwardly and outwardly and only to a slight extent inwardly. As shown in Fig. 4, each of the pans 11 comprises, preferably, a shallow vessel 12, the edges of which are surrounded by a foraminated portion 13, made, preferably, of wire-gauze, said pan being provided with radial partitions 14 therein, and the shaft 10 extending through the pan and being connected to or formed integrally with a flange 15, which is bolted or screwed to the bottom of the pan. Each of the shafts 10 connects by a flexible shafting 16 with a shaft 17. Each shaft 17 is mounted in an outer bearing 18 and in a laterally-movable bearing 19, near the inner end thereof. Each of the bearings 19, as shown particularly in Fig. 3, is movable with respect to a plate 20 by being supported on the bottom of said plate upon pins 21, which are carried in ears 22, cast to said plate. Each of the shafts 17 carries a friction-pinion 23 at its inner end, made, preferably, of rubber, and both of the friction-pinions are engaged and driven by a frictional driving-wheel 24. The friction-pinions 23 are maintained in flexible engagement with the driving-wheel 24 by springs 25, which connect with the bearings 19 and the tension of which may be adjusted by thumb-nuts 26. The driving friction-wheel 24 turns on a suitably-supported shaft 27, as shown, said wheel being formed with a sleeve 28, to which is secured or cast a sprocket-wheel 29. The sprocket-wheel 29 is driven by a chain 30 from a sprocket 31, the tension of said chain being adjusted by an idler 32, as shown. The sprocket 31 is keyed to a shaft 33, mounted in suitable bearings in the frame, and turning with said shaft, but movable longitudinally thereon, is a clutch member 34, adapted to be engaged with a clutch member 35, formed on the hub of a sprocket 36. The clutch member 34 is operated by a lever 37. The sprocket 36 is driven by a sprocket-chain 38 from a sprocket-wheel 39 on the main axle 2. The sprocket-chain 38 may be tightened by an idler 40, as shown. Obviously the turning of the axle 2 drives the shaft 33, and through the sprocket-chain 30 the friction driving-wheel 24 will be driven to drive the shaft 17 and the pans 11 at a very high surface velocity. In practice I have secured excellent results with gearing arranged as shown and described, wherein each of the pan-shafts 10 rotates one hundred and twenty-five times for each rotation of the supporting-wheels 4, and wherein when the device is operating at the ordinary speed of a walking horse the pans rotate approximately fifteen hundred times per minute.

The liquid poison or other material to be diffused is fed to the pans 11 through pipes 41, which lead from the barrel or tank 6, which pipes are preferably provided with a valve 42, which can be controlled by a handle 43 within easy reach of the operator. Ordinarily the operator's seat is placed on the tank or barrel 6, so as to bring the handle 43 and the lever 37 of the clutch 34 35 within easy reach. The lower end of the pipes 41, as shown, is supported from the bracket 8 and delivers the liquid to be sprayed directly upon the pans and ordinarily below the bearings 9 9 therefor.

In operation the supporting-wheels 4 in rotating through the gearing described rotate the pans 11 at a very high speed. The valve 42 being opened, the liquid flows out of the barrel or tank 6 and is directed into the two pans in any desired quantity. The high speed of rotation of the pans throws out the liquid therefrom by centrifugal force, this effect being increased by the use of the partitions 14, which prevent the liquid from settling in the lower part of the pan and in failing to move circumferentially therewith. As the liquid is thrown out over the edge of the pan it passes through the foraminated portion 13, so as to be finely divided. I find in practice that with my improved sprayer the liquid will be distributed from the pans in the form of an extremely fine spray, closely resembling a mist in character and which settles uniformly on all surfaces of the exposed leaves. By operating the handle 43 to close the valve 42 the operator can arrest the spraying operation without stopping the pans, or, if desired, the lever 37 may also be operated to disengage the clutch members 34 and 35, thereby stopping the rotation of the pans.

Having now described my invention, what I claim as new, and desire to secure by Letters Patent, is as follows:

1. In a sprayer, the combination with a frame and the supporting-wheels therefor, of two substantially horizontal shafts arranged at an angle of approximately ninety degrees apart, connections between the supporting-wheels and said shafts for rotating the shafts at high speed, two spraying-pans supported by the frame, maintained at an angle with respect to each other in an inclined plane and arranged substantially at right angles to the respective driving-shafts therefor, and connections between each of said driving-shafts and the adjacent spraying-pan, substantially as and for the purposes set forth.

2. In a sprayer, the combination with a frame and the supporting-wheels therefor, of a friction driving-wheel, connections between said driving-wheel and the supporting-wheels of the sprayer, two substantially horizontal shafts arranged approximately ninety degrees apart, a friction-wheel on said shaft coöperating with said driving-wheel, two spraying-pans supported by the frame, maintained at an angle with respect to each other in an inclined plane and arranged substantially at right angles to the respective driving-shafts therefor, and connections between each of said driving-shafts and the adjacent spraying-pan, substantially as and for the purposes set forth.

3. In a sprayer, the combination with the frame and the supporting-wheels, of a spraying-pan supported from said frame at an angle with respect thereto, a flexible shaft connected to said pan, a shaft connected to said flexible shaft, and connections between said shaft and the driving-wheels for rotating the former, substantially as set forth.

4. In a sprayer, the combination with the frame and the supporting-wheels, of a spraying-pan supported from said frame at an angle with respect thereto, a flexible shaft connected to said pan, a shaft connected to said flexible shaft, connections between said shaft and the driving-wheels for rotating the former, and a clutch in said connections for arresting the movement of said shaft independent of the driving-wheels, substantially as set forth.

5. In a sprayer, the combination with the frame and the supporting-wheels therefor, of a bracket carried by said frame at its rear, a pan-shaft supported in said bracket, a pan on said shaft, a flexible shafting connected with the pan-shaft, a substantially horizontal shaft connected to said flexible shafting, a friction-pinion on said shaft, a friction driving-wheel engaging said pinion for driving the latter, and connections between said friction driving-wheel and the supporting-wheels of the sprayer, substantially as set forth.

6. In a sprayer, the combination with the frame and the supporting-wheels therefor, of a bracket carried by said frame at its rear, a pan-shaft supported in said bracket, a pan on said shaft, a flexible shafting connected with the pan-shaft, a substantially horizontal shaft connected to said flexible shafting, a friction-pinion on said shaft, a friction driving-wheel engaging said pinion for driving the latter, means for elastically engaging said friction-pinion with its driving-wheel, and connections between said friction driving-wheel and the supporting-wheels of the sprayer, substantially as set forth.

7. In a sprayer, the combination with the frame and the supporting-wheels, of the shafts 17, 17, the spraying-pans, flexible shafting connecting said spraying-pans with the shafts 17, the friction-pinions 23 on said shafts, the friction driving-gear 24 engaging and driving said pinions, and connections between the supporting-wheels and said friction driving-gear, substantially as set forth.

This specification signed and witnessed this 7th day of December, 1900.

HENRY I. SCHANCK.

Witnesses:
 AMOS B. BROCKLEBANK,
 HENRY C. GRAVUTT.